(12) United States Patent
Sun et al.

(10) Patent No.: US 9,832,040 B2
(45) Date of Patent: Nov. 28, 2017

(54) REDIRECTING VIRTUAL MACHINE TRAFFIC

(71) Applicant: HEWLETT PACKARD ENTERPRISE DEVELOPMENT LP, Houston, TX (US)

(72) Inventors: Songer Sun, Beijing (CN); Xiaoping Han, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/649,875

(22) PCT Filed: Jan. 2, 2014

(86) PCT No.: PCT/CN2014/070005
§ 371 (c)(1),
(2) Date: Jun. 4, 2015

(87) PCT Pub. No.: WO2014/117641
PCT Pub. Date: Aug. 7, 2014

(65) Prior Publication Data
US 2015/0326407 A1   Nov. 12, 2015

(30) Foreign Application Priority Data

Jan. 31, 2013 (CN) .......................... 2013 1 0044891

(51) Int. Cl.
*H04L 12/46* (2006.01)
*H04L 12/54* (2013.01)
(Continued)

(52) U.S. Cl.
CPC ...... *H04L 12/4645* (2013.01); *G06F 9/45558* (2013.01); *H04L 12/4666* (2013.01);
(Continued)

(58) Field of Classification Search
None
See application file for complete search history.

(56) References Cited

U.S. PATENT DOCUMENTS

| 8,381,209 B2 | 2/2013 | Reumann et al. |
| 9,043,792 B1 * | 5/2015 | Xu .......................... H04L 49/70 370/218 |

(Continued)

FOREIGN PATENT DOCUMENTS

| CN | 1538675 | 10/2004 |
| CN | 101383835 | 3/2009 |
| CN | 102710485 | 10/2012 |

OTHER PUBLICATIONS

"Distributed Virtual Data Center for Enterprise and Service Provider Cloud", Cisco, 2012.

(Continued)

*Primary Examiner* — Duc Duong
(74) *Attorney, Agent, or Firm* — Hewlett Packard Enterprise Patent Department

(57) ABSTRACT

According to an example, in a method for redirecting virtual machine traffic a virtual switch may be implemented in a physical server. In addition, a packet sent from a first virtual machine to a second virtual machine may be detected, in which the first virtual machine and the second virtual machine are in the same virtual local area network (VLAN), and in which the packet has a first VLAN label that identifies the VLAN. Moreover, the first VLAN label may be replaced with a second VLAN label in the packet, in which the second VLAN label differs from the first VLAN label, and the packet may be sent to an uplink switch, in which the uplink switch may send the packet to a network security module.

15 Claims, 5 Drawing Sheets

(51) Int. Cl.
    *G06F 9/455*     (2006.01)
    *H04L 12/931*    (2013.01)
(52) U.S. Cl.
    CPC .......... *H04L 12/4675* (2013.01); *H04L 49/70*
               (2013.01); *G06F 2009/45595* (2013.01)

(56) References Cited

U.S. PATENT DOCUMENTS

| | | |
|---|---|---|
| 2010/0103837 A1 | 4/2010 | Jungck et al. |
| 2011/0090911 A1* | 4/2011 | Hao .................... H04L 12/4633 |
| | | 370/395.53 |
| 2012/0063363 A1* | 3/2012 | Li ....................... H04L 12/4645 |
| | | 370/255 |
| 2012/0300615 A1 | 11/2012 | Kempf et al. |
| 2012/0331142 A1* | 12/2012 | Mittal .................... H04L 49/354 |
| | | 709/225 |
| 2013/0094508 A1 | 4/2013 | Turner et al. |
| 2013/0266019 A1* | 10/2013 | Qu .......................... H04L 45/74 |
| | | 370/395.53 |
| 2013/0336331 A1* | 12/2013 | Woerndle ............ H04L 12/4641 |
| | | 370/409 |
| 2014/0059537 A1* | 2/2014 | Kamble .............. G06F 9/45558 |
| | | 718/1 |
| 2014/0092907 A1* | 4/2014 | Sridhar .................... H04L 45/74 |
| | | 370/392 |
| 2014/0096183 A1* | 4/2014 | Jain ..................... H04L 12/4641 |
| | | 726/1 |
| 2014/0123211 A1* | 5/2014 | Wanser .................... H04L 63/10 |
| | | 726/1 |
| 2014/0201733 A1* | 7/2014 | Benny ..................... G06F 9/455 |
| | | 718/1 |

OTHER PUBLICATIONS

International Search Report and Written Opinion dated Mar. 20, 2014 issued on PCT Patent Application No. PCT/CN2014/070005 dated Jan. 2, 2014, The State Intellectual Properly Office, P.R. China.

\* cited by examiner

REDIRECTING VIRTUAL MACHINE TRAFFIC

CLAIM FOR PRIORITY

The present application is a national stage filing under 35 U.S.C. § 371 of PCT application number PCT/CN2014/070005, having an international filing date of Jan. 2, 2014, which claims priority to Chinese patent application number 201310044891.6, having a filing date of Jan. 31, 2013, the disclosures of which are hereby incorporated by reference in their entireties.

BACKGROUND

There has been a marked increase in the virtualization of the computation, networking, and storage components of data centers. Particularly, virtualization of a server, which is used as a computing resource in data centers, is one of the most developed and core techniques in cloud computing. In a server virtualization technique, multiple virtual machines may be virtualized from a single physical server. In addition, independent operating systems and applications may be installed in the physical server for each of the virtual machines. As such, the utilization rate and the hardware resources of the physical server may be effectively increased.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
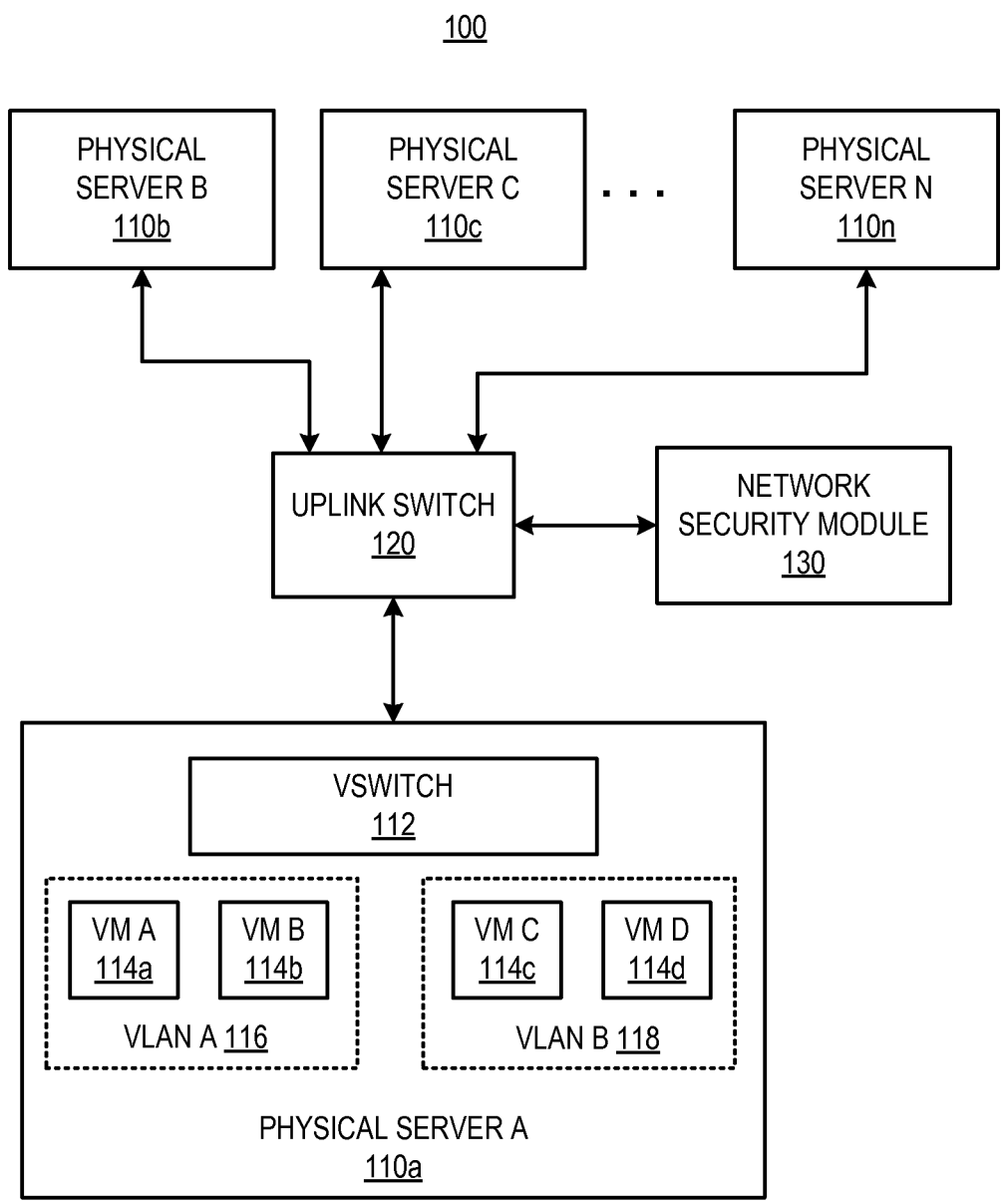
FIG. 1 is a simplified diagram of a network, in which various aspects of the methods and apparatuses disclosed herein may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The application of virtualization techniques on servers has resulted in multiple virtual machines being virtualized on the same physical server. However, because data packets communicated between the virtual machines in the same physical server typically need not leave the physical server to be forwarded to each other, these data packets may not undergo the same level of security processes as other data packets that are communicated between physical servers through uplink switches. As a result, in order for these data packets to undergo a predetermined level of security processes, these data packets are often forwarded to an external network security module.

A conventional manner of redirecting packets sent between virtual machines in the same physical server to an external access switch or an external network security module, such as IEEE 802.1 BR, involves making modifications simultaneously to the hypervisor layer, the server network interface controller layer, and the access switch layer of the physical server. Particularly, the IEEE 802.1 BR standard requires that the redirection in the hypervisor layer be modified and that each of the virtual machines have a corresponding virtual path and a virtual port on an access switch. As such, the access switch must be modified to a relatively large extent to support the forwarding of the traffic, which may be technically difficult.

In contrast, disclosed herein are methods and apparatuses in which functional modules of a virtual switch in a physical server on which multiple virtual machines are virtualized may be modified such that, when packet traffic (e.g., Layer 2 traffic), is detected between different virtual machines in the same VLAN, the VLAN label of the packet traffic may be replaced to cause the packet traffic to be redirected to a network security module. In addition, the network security module may replace the VLAN label with another VLAN label to ensure that the packet traffic is correctly returned to the virtual switch. The virtual switch may replace the another VLAN label with the original label such that the packet is delivered to the correct destination virtual machine. In one regard, therefore, the methods and apparatuses described in the present disclosure may be relatively simpler and cost effective as compared with conventional packet redirection techniques.

With reference first to FIG. 1, there is shown a simplified diagram of a network 100, in which various aspects of the methods and apparatuses disclosed herein may be implemented, according to an example. It should be understood that the network 100 depicted in FIG. 1 may include additional elements and that some of the elements depicted therein may be removed and/or modified without departing from a scope of the network 100.

The network 100 in FIG. 1 is depicted as including a plurality of physical servers 110a-110n (the variable "n" may represent an integer greater than 1), an uplink switch 120, and a network security module 130. The physical servers 110a-110n are depicted as being in communication with the uplink switch 120, and the uplink switch 120 is depicted as being in communication with the network security module 130. One of the physical servers 110a is further depicted as including a virtual switch (VSwitch) 112 and virtual machines (VMs) A-D 114a-114d. Particularly, the VSwitch 112 and the VMs 114a-114d are depicted as running or otherwise being implemented, e.g., virtualized, on physical server A 110a. In addition, two of the VMs 114a-114b are depicted as being in a first virtual local area network (VLAN) 116 and the other two of the VMS 114c-114d are depicted as being in a second VLAN 118. Some or all of the remaining physical servers 110b-110n may run or otherwise have virtual switches and VMs implemented thereon in a similar manner.

Generally speaking, the physical server 110a may be virtualized through introduction of a virtualized layer into the physical server 110a. The virtualized layer may be an intermediate layer virtualization software that may create the VMs 114a-114d and may allocate hardware resources to the VMs 114a-114d. For instance, the intermediate layer virtualization software may allocate kernels, e.g., complete computing engines integrated in the CPU of the physical server 110a, in the CPU to the VMs 114a-114d. Each of the VMs 114a-114d may be considered as being the same as a conventional physical server in terms of the VM's logical function and the VM's may have their own operating system and applications.

The VSwitch 112 may be a software program or a set of instructions that enables the VMs 114a-114d within the same physical server 110a and/or in other physical servers 110b-110n to communicate with one another. The VMs 114a-114d may each generally be defined as a software implementation of a machine, e.g., a computer, that executes programs similarly to a physical machine. The VLANs 116 and 118 may generally be defined as a network of VMs that behave as if they are connected to the same wire. That is, the VMs 114a-114b in the VLAN 116 may behave as if they are in the same LAN and this behavior may be configured through machine readable instructions. Thus, for instance, the VMs 114a-114b in the same VLAN 116 may have a first VLAN identifier (ID) or label and the VMs 114c and 114d in the other VLAN 118 may have a different VLAN ID or label.

In the virtualized physical server 110a, there may be direct packet transfer (e.g., direct Layer 2 traffic exchange) between the VMs 114a-114d. However, for some of the VMs, for instance, those VMs that belong to the same VLAN and are in the same broadcast domain, the packet transfer need not go through a gateway device. Instead, each of the VMs 114a-114d may learn the media access control (MAC) addresses of the other VMs 114a-114d through implementation of an address resolution protocol (ARP). As such, when a message is sent from a first VM 114a to a second VM 114b that is in the same VLAN 116, the first VM 114a may use the MAC address of the second VM 114b as the destination MAC address. When this message reaches the VSwitch 112, the VSwitch 112 may perform forwarding (e.g., Layer 2 forwarding) by looking up a MAC address table. As such, the packet may not need to be forwarded to an external switch, e.g., the uplink switch 120, for packet switching (e.g., Layer 2 switching) to be performed. Instead, the VSwitch 112 may directly forward the packet to the destination VM 114b. In one regard, therefore, traffic communicated between VMs 114a-114d in the same physical server 110a and in the same VLAN 116, 118 may not be monitored or controlled through the external switch, e.g., the uplink switch 120.

According to an example, the VSwitch 112 may redirect the traffic communicated between VMs 114a-114d in the same VLAN 116, 118 to the uplink switch 120 such that the traffic may be monitored for compliance with a security strategy. As discussed in greater detail herein below, the VSwitch 112 may modify features of packets contained in such traffic to cause the packets to be analyzed by the network security module 130.

The uplink switch 120, which may be a Layer 2 switch, may receive packets of data, also referenced herein as "packets", from the physical servers 110a-110n and may forward the packets to the network security module 130 and/or to other ones of the physical servers 110a-110n. Additionally, the uplink switch 120 may receive packets, which may also be Layer 2 data packets, from the network security module 130 and may forward the packets to the physical servers 110a-110n. The uplink switch 120 may also communicate packets with devices (not shown) that are external to the network 100.

According to an example, the uplink switch 120 may analyze the packets communicated with the external devices, for instance, packets received from the external devices, to determine whether the packets should be further analyzed by the network security module 130. The uplink switch 120 may also analyze the packets communicated between the physical servers 110a-110n to determine whether those packets should be further analyzed by the network security module 130. The analysis by the uplink switch 120 may include, for instance, a determination as to whether the packets originate from a known or suspected malicious host, a determination as to whether the packets have a number of destinations that exceed a predetermined number, etc. In this example, responsive to a determination that the packets should be further analyzed, the uplink switch 120 may forward the packets to the network security module 130. In another example, the uplink switch 120 may forward all of the packets that the uplink switch 120 receives to the network security module 130.

The network security module 130 may be any suitable device or set of machine readable instructions stored on a device that is to provide security to the network 100. That is, the network security module 130 may be any suitable device or set of machine readable instructions that may perform intrusion detection, intrusion prevention, or other security processes on packets communicated between, among, and within components in the network 100. Thus, for instance, the network security module 130 may analyze packets received from the uplink switch 120 to determine whether the packet may be malicious, e.g., a virus, part of a denial of service attack, etc. In addition, although the network security module 130 has been depicted as being separate from the uplink switch 120, it should be understood that the network security module 130 may be integrated with the uplink switch 120 without departing from a scope of the present disclosure. Thus, for instance, the network security module 130 may be integrated as hardware and/or machine readable instructions with the uplink switch 120.

According to an example, the network security module 130 may also perform security analyses on packets communicated between the VMs 114a-114b within the same VLAN 116 on the same physical server 110a. Various manners in which the packets communicated between the VMs 114a-114b within the same VLAN 116 on the same physical server 110a are directed to and received from the network security module 130 are discussed in greater detail herein below.

Figure 2:
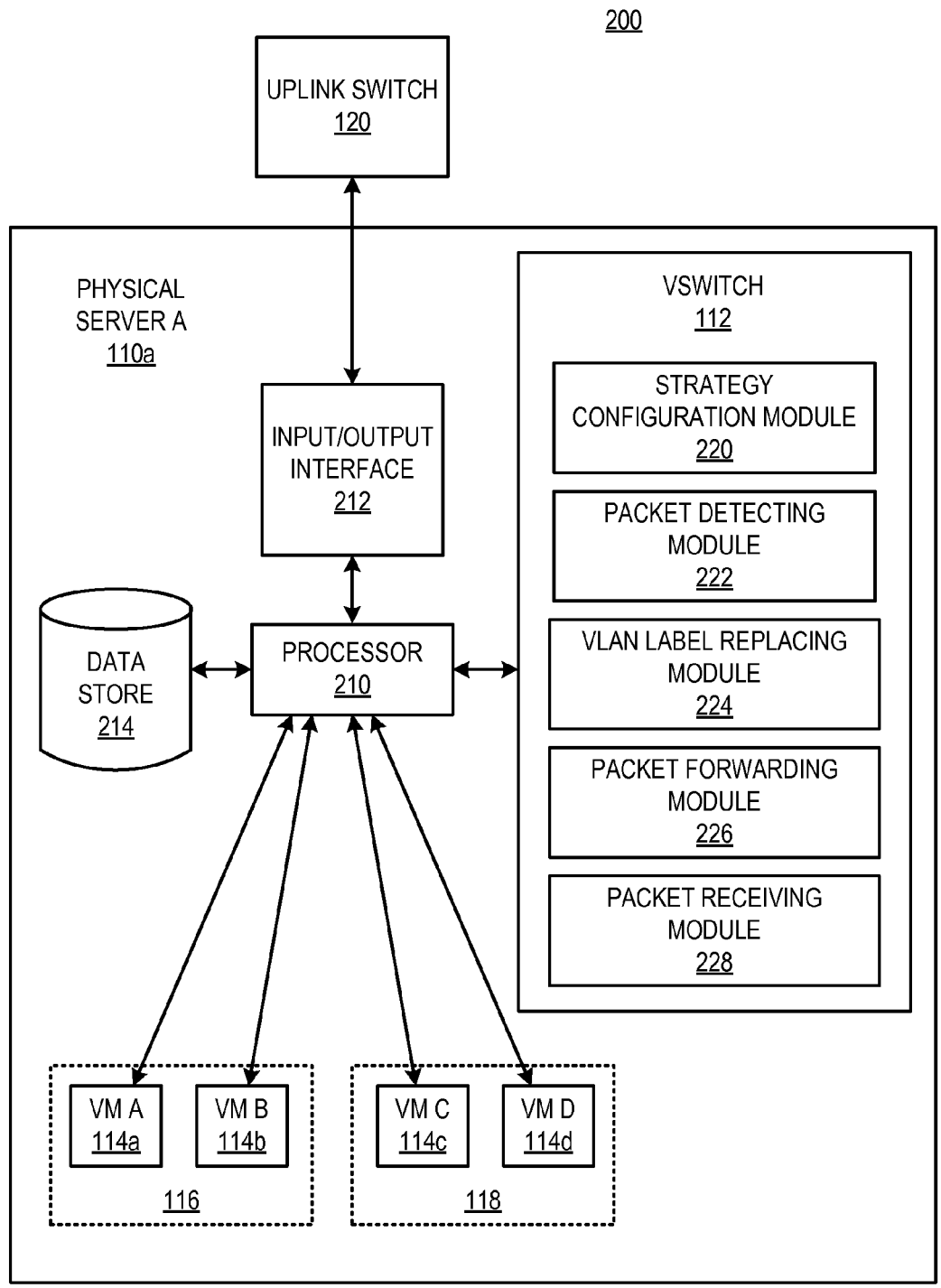
FIG. 2 is a simplified block diagram of the physical server and the uplink switch depicted in FIG. 1, according to an example of the present disclosure.

Turning now to FIG. 2, there is shown a simplified block diagram 200 of the physical server 110a and the uplink switch 120 depicted in FIG. 1, according to an example. It should be understood that the physical server 110a depicted in FIG. 2 may include additional elements and that some of the elements depicted therein may be removed and/or modified without departing from a scope of the physical server 110a. In addition, it should be understood that some or all of the other physical servers 110b-110n may have configurations similar to the physical server 110a.

As shown in FIG. 2, the physical server 110a includes the VSwitch 112 and the VMs 114a-114d arranged in multiple VLANs 116 and 118. The physical server 110a is also depicted as including a processor 210, an input/output interface 212, and a data store 214. The VSwitch 112 is also depicted as including a strategy configuration module 220, a packet detecting module 222 (which may also be referred to as a message monitoring module), a VLAN label replacing module 224 (which may also be referred to as a virtual switching module), a packet forwarding module 226, and a packet receiving module 228.

The processor 210, which may be a microprocessor, a micro-controller, an application specific integrated circuit (ASIC), or the like, is to perform various processing functions in the physical server 110a. The processing functions may include invoking or implementing the VSwitch 112 and the VMs 114a-114d. The processing functions may also include invoking or implementing the modules 220-228 of the VSwitch 112 as discussed in greater detail herein below. According to an example, the VSwitch 112 and the VMs 114a-114d are various sets of machine readable instructions stored on a hardware device, for instance, a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored. In this example, the modules 220-228 may be software modules, e.g., sets of machine readable instructions, stored in physical server 110a.

The processor 210 may store data in the data store 214 and may use the data in implementing the modules 220-228. The data store 214 may be volatile and/or non-volatile memory, such as DRAM, EEPROM, MRAM, phase change RAM (PCRAM), memristor, flash memory, and the like. In addition, or alternatively, the data store 214 may be a device that may read from and write to a removable media, such as, a floppy disk, a CD-ROM, a DVD-ROM, or other optical or magnetic media.

The input/output interface 212 may include hardware and/or software to enable the processor 210 to communicate with devices in the network 100 (FIG. 1), such as the network switch 120, through a wired and/or wireless connection. Thus, the input/output interface 212 may include a network interface card. The input/output interface 212 may also include hardware and/or software to enable the processor 210 to communicate with various input and/or output devices (not shown), such as a keyboard, a mouse, a display, etc., through which a user may input instructions into the physical server 110a and may view outputs from the physical server 110a.

Figure 3:
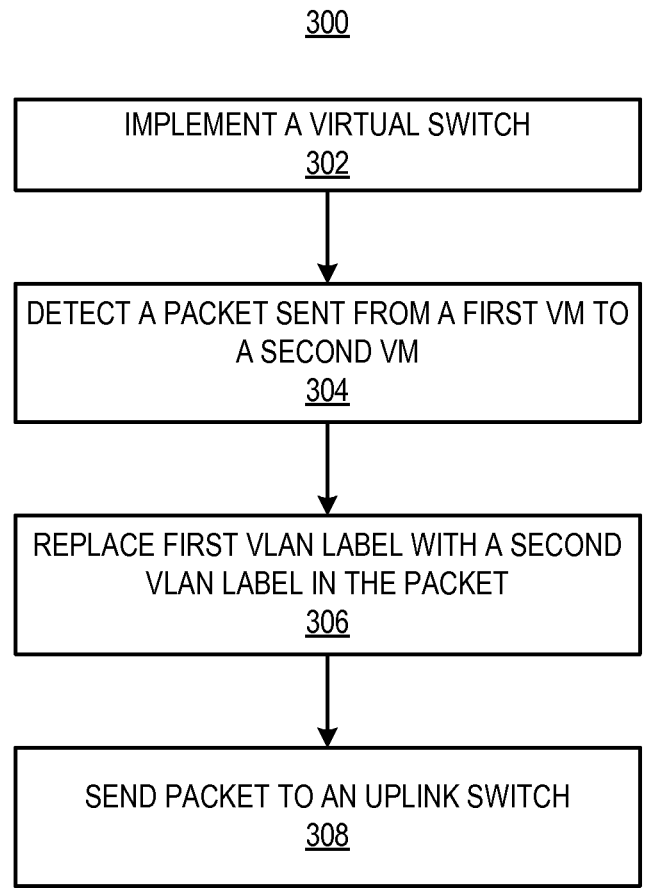
FIGS. 3 and 4, respectively, are flow diagrams of methods for redirecting virtual machine traffic, according to two examples of the present disclosure.
Figure 4:
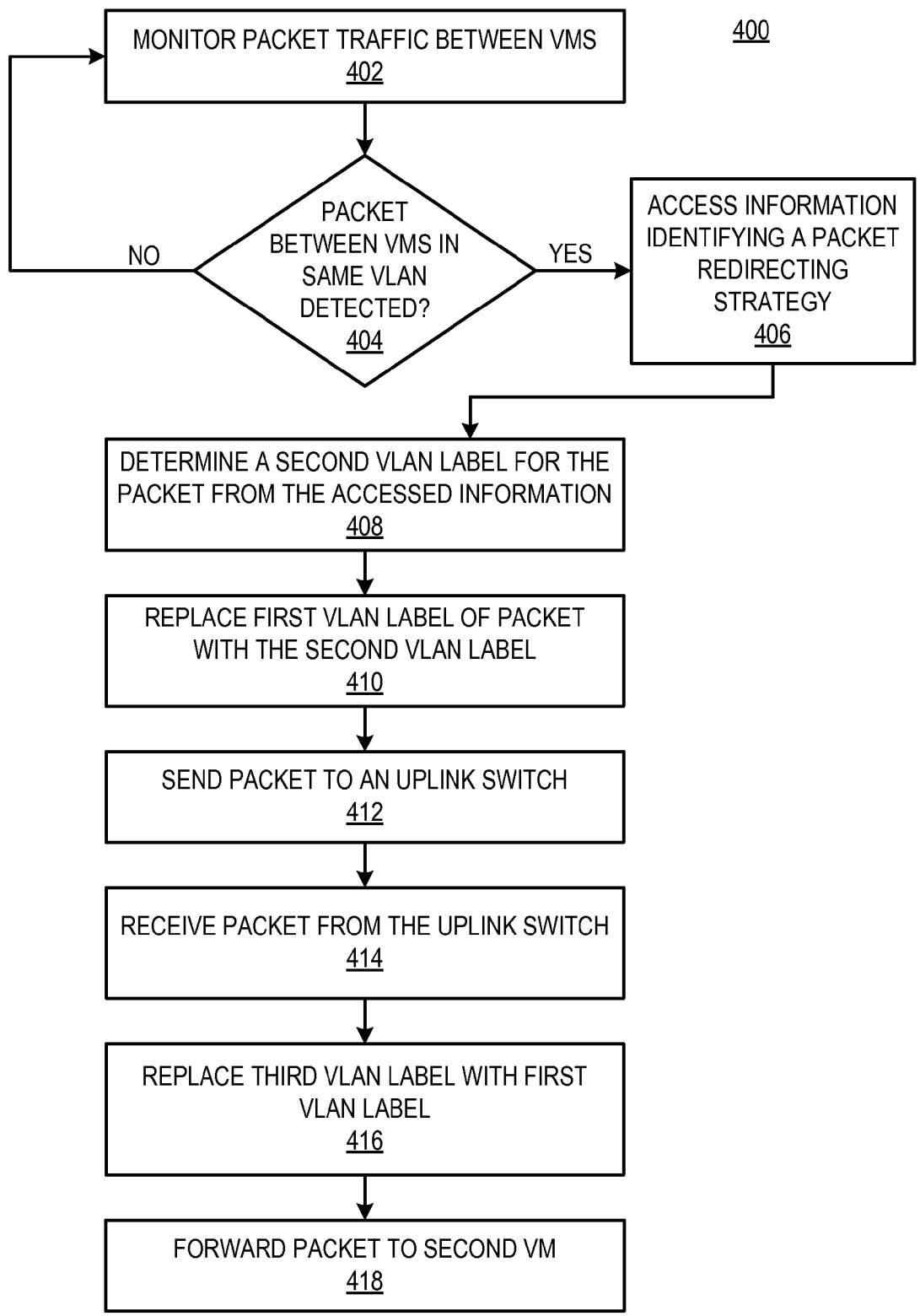

Various manners in which the processor 210 in general, and the modules 220-228 in particular, may be implemented are discussed in greater detail with respect to the methods 300 and 400 depicted in FIGS. 3 and 4. Particularly, FIGS. 3 and 4, respectively, depict flow diagrams of methods 300 and 400 for redirecting virtual machine traffic, according to two examples. It should be apparent to those of ordinary skill in the art that the methods 300 and 400 represent generalized illustrations and that other operations may be added or existing operations may be removed, modified, or rearranged without departing from the scopes of the methods 300 and 400. Generally speaking, the processor 210 depicted in FIG. 2 may implement the methods 300 and 400 through implementation of the modules 220-226.

With reference first to FIG. 3, at block 302, the processor 210 may implement a virtual switch (VSwitch) 112. That is, the processor 210 may invoke or implement a set of machine readable instructions that functions as a VSwitch 112 in the physical server 110a.

At block 304, a packet sent from a first virtual machine (VM) 114a to a second VM 114b may be detected, in which the first VM 114a and the second VM 114b may be in the same VLAN, and in which the packet may have a first VLAN label that identifies the VLAN. For instance, the processor 210 may implement the packet detecting module 222, which may equivalently be referred to as a message monitoring module, to detect the communication of the packet from the first VM 114a to the second VM 114b.

At block 306, the first VLAN label may be replaced with a second VLAN label in the packet, in which the second VLAN label differs from the first VLAN label. For instance, the processor 210 may implement the VLAN replacing module 224, which may equivalently be referred to as a virtual switching module, to replace the first VLAN label with the second VLAN label.

At block 308, the packet may be sent to an uplink switch 120, in which the packet carries the transformed VLAN label, i.e., the second VLAN label. For instance, the processor 210 may implement the packet forwarding module 226 to send the packet to the uplink switch 120 through the input/output interface 212. In addition, the uplink switch 120 may send the packet to a network security module 130 for the network security module 130 to analyze the packet for security purposes. The network security module 130 may drop the packet if the network security module 130 determines that the packet may be malicious. However, if the network security module 130 determines that the packet is safe, the network security module 130 may replace the second VLAN label of the packet with a third VLAN label. The operations that may be performed by the uplink switch 120 and the processor 210 following analysis of the packet by the network security module 130 are discussed in greater detail below with respect to FIG. 4.

Turning now to FIG. 4, at block 402, packet traffic between the VMs 114a-114d on the physical server 110a may be monitored. For instance, the processor 210 may implement the packet detecting module 222 to monitor the communication of packets between the VMs 114a-114d for packets being sent between the VMs 114a-114b in the same VLAN 116 (or VMs 114c-114d in VLAN 118). If packets being sent between VMs 114a-114d are not between VMs 114a-114d in the same VLAN, the packet traffic may continue to be monitored at block 402.

However, if a packet that is sent from a first VM 114a to a second VM 114b that are in the same VLAN 116 is detected at block 404, information identifying a packet redirecting strategy may be accessed, as indicated at block 406. Particularly, for instance, the processor 210 may access previously determined information that indicates the VLAN label transformation strategy to be applied to the packets. The previously determined information may have been determined by the strategy configuration module 220. Particularly, the strategy configuration module 220 may configure or may be used to configure a VLAN transformation rule for a layer 2 traffic message sent among different VMs of the same VLAN according to a predetermined strategy. The previously determined information may be stored, for instance, in the data store 214 as a table. An example table is provided below.

TABLE 1

| Strategy Application Port | Strategy Application VLAN | Source-Destination IP Address Relation | Strategy Application Tuple | VLAN Label Transformation |
|---|---|---|---|---|
| Connect to VM Uplink Port | 100 | Source IP Address<–destination IP Address | Src: 192.168.1.0/24; dst: 192.168.1.0/24 | 10 |
| Connect to VM Uplink port | 100 | Source IP address–>destination IP address | Src: 192.168.1.0/24; dst: 192.168.1.0/24 | 20 |
| Connect to Downlink port of a physical network interface controller | 20 | Source IP address<–destination IP address | Src: 192.168.1.0/24; dst: 192.168.1.0/24 | 100 |
| Connect to downlink port of a physical network interface controller | 10 | Source IP address–>destination IP address | Src: 192.168.1.0/24; dst: 192.168.1.0/24 | 100 |

As may be seen from Table 1, the VLAN label transformation rule may specifically define how the VLAN labels are to be transformed depending upon various factors associated with packet communications.

At block 408, a second VLAN label for the packet may be determined from the accessed information. For instance, the processor 210 may determine which of the VLAN labels contained in Table 1 applies to the packet.

At block 410, the first VLAN label may be replaced in the packet with the second VLAN label determined at block 408, in which the second VLAN label differs from the first VLAN label. For instance, the processor 210 may implement the VLAN replacing module 224 to replace the first VLAN label with the second VLAN label.

At block 412, the packet may be sent to an uplink switch 120, in which the packet carries the transformed VLAN label, i.e., the second VLAN label. In one regard, because the packet has a VLAN label that crosses multiple VLANs, the VSwitch 112 may consider the packet as an IP communication among cross-VLANs and may thus determine that the packet is to be processed by an external gateway device, e.g., the uplink switch 120. For example, VSwitches may automatically forward cross VLAN traffic to an external physical switch. As such, the VSwitch 112 may automatically send the packet to the uplink switch 120 because of the transformed VLAN label in the packet. The processor 210 may implement the packet forwarding module 226 to send the packet to the uplink switch 120 through the input/output interface 212. In addition, the uplink switch 120 may send the packet to a network security module 130 for the network security module 130 to analyze the packet for security purposes.

The network security module 130 may perform security processing on the packet, for instance, in any of the manners discussed above. If the network security module 130 determines that the packet may be malicious or otherwise constitute a threat, the network security module 130 may drop the packet. However, if the packet is deemed to be safe, the network security module 130 may replace the second VLAN label with a third VLAN label, in which the third VLAN label differs from the second VLAN label and the first VLAN label and may have been determined according to a pre-set VLAN label transformation rule. Alternatively, however, the network security module 130 may replace the second VLAN label with the third VLAN label prior to performing the security processing on the packet. In any regard, the network security module 130 may replace the second VLAN label with the third VLAN label to avoid an inverse traffic message, e.g., Layer 2 message from the second VM 114b to the first VM 114a, from being directly sent to a VM without being processed by the network security module 130. Without making this change, the inverse traffic message may directly be sent to a destination VM because the uplink switch 120 may have learned information such as the MAC address of the forward Layer 2 traffic message during the initial communication of the traffic message from the first VM 114a to the second VM 114b and may thus forward the inverse traffic message directly because the inverse traffic message is considered as being communicated to VMs in the same VLAN.

At block 414, the packet carrying the third VLAN label may be received from the uplink switch 120. The processor 210 may implement the packet receiving module 228 to receive the packet from the uplink switch 120 through the input/output interface 212.

At block 416, the third VLAN label in the packet may be replaced with the first VLAN label determined at block 408. For instance, the processor 210 may implement the VLAN replacing module 224 to replace the third VLAN label with the first VLAN label. The processor 210 may access the information identifying the packet redirecting strategy to determine that the third VLAN label is to be replaced with the first VLAN label.

At block 418, the packet, which now carries the first VLAN label, may be forwarded to the second VM 114b. The processor 210 may implement the packet forwarding module 226 to forward the packet to the second VM 114b according to the destination MAC address contained in the packet.

Although not shown in FIG. 4, in response to receipt of an inverse packet, i.e., a packet from the second VM 114b to the first VM 114a, the processor 210 may replace the VLAN label of the packet with a VLAN packet identified in the information identifying the packet redirecting strategy. That is, the information identifying the packet redirecting strategy may indicate that the first VLAN label is to be replaced with the third VLAN label and thus, the processor 210 may replace the first VLAN label in the packet with the third VLAN label. In addition, the packet may be sent to the uplink switch 120 and the network security module 130 as discussed above with respect to the FIG. 4. Moreover, the network security module 130 may replace the third VLAN label with another VLAN label, e.g., the second VLAN label, according to the packet redirecting strategy information prior to forwarding the packet to the uplink switch 120. Furthermore, the uplink switch 120 may forward the packet to the VSwitch 112, which may replace the another VLAN label in the packet with the first VLAN label and forward the packet to the first VM 114*a*.

Through implementation of the methods 300 or 400, traffic communicated between VMs in the same VLAN of the same physical server that may otherwise not undergo external security processing, may be redirected outside of the physical server to a network security module. In addition, traffic may be redirected without requiring that the hypervisor layer, the server network interface controller layer, and access switch layer of the physical server be modified.

The following example is provided with respect to the information contained in Table 1. In this example, when the packet detecting module 222 of the VSwitch 112 detects the arrival of a Layer 2 packet between the first VM 114*a* and the second VM 114, the VLAN label may need to be modified according to a pre-set VLAN label transformation rule. Thus, for instance, if the VLAN label of the first VM 114*a* and the second VM 114*b* is VLAN100, the pre-set VLAN label transformation rule identified in Table 1 indicates that the VLAN label is to be modified from VLAN100 to VLAN10. Following replacement of the VLAN label, the packet may be sent to the network security module 130 via the uplink switch 120.

In addition, to avoid traffic sent from the second VM 114*b* to the first VM 114*a*, whose VLAN label is VLAN100, from being directly sent to the first VM 114*a* without being processed by the network security module 130, the network security module 130 may replace the VLAN label of the packet to another VLAN label identified in the pre-set VLAN label transformation rule. Thus, as indicated in Table 1, the network security module 130 may replace VLAN10 with VLAN20. The network security module 130 may also forward the packet back to the VSwitch 112 via the uplink switch 120. In addition, the VSwitch 112 may replace VLAN20 with VLAN100 and may forward the packet to the second VM 114*b* according to the destination MAC address contained in the packet.

When the VSwitch 112 receives an inverse packet, i.e., from the second VM 114*b* to the first VM 114*a*, the VSwitch 112 may replace the first VLAN100 with the third VLAN20 for the VLAN label according to the label transformation rule to ensure that the inverse packet is also processed by the external network security module 130. The forwarding procedure of the inverse packet may be the same as that of the forward packet discussed with respect to FIG. 4, and will thus not be elaborated further.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 5:
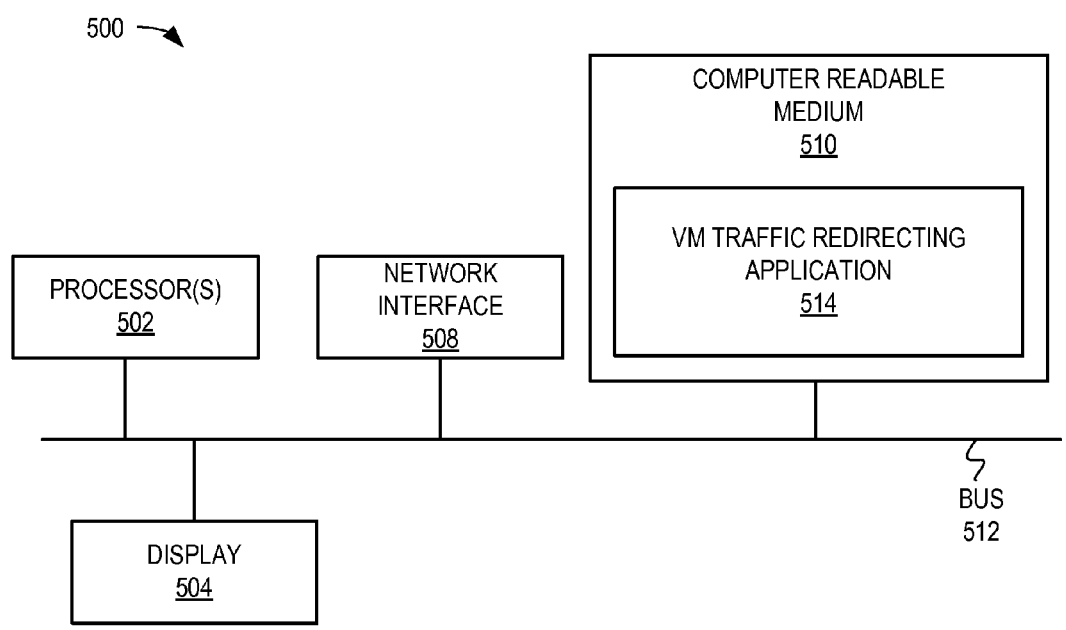
FIG. 5 is schematic representation of a computing device, which may be employed to perform various functions of the physical server depicted in FIG. 2, according to an example of the present disclosure.

Turning now to FIG. 5, there is shown a schematic representation of a computing device 500, which may be employed to perform various functions of the physical server 110*a* depicted in FIG. 2, according to an example. The device 500 may include a processor 502, a display 504, such as a monitor; a network interface 508, such as a Local Area Network LAN, a wireless 802.11x LAN, a 3G mobile WAN or a WiMax WAN; and a computer-readable medium 510. Each of these components may be operatively coupled to a bus 512. For example, the bus 512 may be an EISA, a PCI, a USB, a FireWire, a NuBus, or a PDS.

The computer readable medium 510 may be any suitable medium that participates in providing instructions to the processor 502 for execution. For example, the computer readable medium 510 may be non-volatile media, such as an optical or a magnetic disk; volatile media, such as memory. The computer-readable medium 510 may also store a VM traffic redirecting application 514, which may perform the methods 300 and/or 400 and may include the modules 220-228 of the VSwitch 112 depicted in FIGS. 1 and 2. In this regard, the VM traffic redirecting application 514 may include a strategy configuration module 220, a packet detecting module 222, a VLAN label replacing module 224, a packet forwarding module 226, and a packet receiving module 228.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for redirecting virtual machine traffic, said method comprising:
    implementing, by a processor, a virtual switch in a physical server;
    detecting, by the processor, a packet sent from a first virtual machine to a second virtual machine, wherein the first virtual machine and the second virtual machine are in the same virtual local area network (VLAN), and wherein the packet has a first VLAN label that identifies the VLAN;
    replacing, by the processor, the first VLAN label with a second VLAN label in the packet, wherein the second VLAN label differs from the first VLAN label; and
    in response to the first VLAN label being replaced with the second VLAN label in the packet, sending, by the processor, the packet to an uplink switch, wherein the uplink switch is to send the packet to a network security module.

2. The method according to claim 1, wherein the virtual switch is composed of machine readable instructions stored on the physical server, wherein at least one of the first virtual machine the second virtual machine runs on the physical server, and wherein the network security module is external to the physical server.

3. The method according to claim 2, wherein the apparatus implements a plurality of virtual machines, said method further comprising:
monitoring traffic of packets flowing between the plurality of virtual machines for the packet sent from the first virtual machine to the second virtual machine.

4. The method according to claim 1, wherein the network security module is to process the packet, replace the second VLAN label of the packet with a third VLAN label, and send the packet to the uplink switch, said method further comprising:
receiving the packet having the third VLAN label from the uplink switch following processing of the packet by the network security module;
replacing the third VLAN label of the packet with the first VLAN label; and
forwarding the packet to the second virtual machine.

5. The method according to claim 4, further comprising:
detecting a packet sent from the second virtual machine to the first virtual machine, wherein the packet has the first VLAN label;
replacing the first VLAN label with the third VLAN label in the packet;
sending the packet to the uplink switch, wherein the uplink switch is to send the packet to the network security module.

6. The method according to claim 5, wherein the network security module is to process the packet, replace the third VLAN label of the packet with another VLAN label, and send the packet to the uplink switch, said method further comprising:
receiving the packet having the another VLAN label from the uplink switch following processing of the packet by the network security module;
replacing the another VLAN label of the packet with the first VLAN label; and
forwarding the packet to the first virtual machine.

7. The method according to claim 1, wherein the uplink switch is a Layer 2 switch.

8. The method according to claim 1, wherein the packet is a Layer 2 data packet.

9. The method according to claim 1, further comprising:
accessing information identifying a packet redirecting strategy to be employed by the processor; and
determining the second VLAN label based upon the packet redirecting strategy identified in the accessed information.

10. A physical server on which a first virtual machine and a second virtual machine are operational, said physical server comprising:
a processor; and
a memory on which is store machine readable instructions that when executed by the processor cause the processor to:
implement a virtual switch for the first virtual machine and the second virtual machine, wherein the first virtual machine and the second virtual machine are in the same virtual local area network (VLAN) that is identified by a first VLAN label;
detect a packet sent from the first virtual machine to the second virtual machine;
replace the first VLAN label with a second VLAN label, wherein the second VLAN label differs from the first VLAN label; and
in response to the first VLAN label being replaced with the second VLAN label in the packet, send the packet to an uplink switch, wherein the uplink switch is to send the packet to a network security module.

11. The physical server according to claim 10, wherein the network security module is to process the packet, replace the second VLAN label with a third VLAN label, and send the packet to the uplink switch, and wherein the machine readable instructions are further to cause the processor to:
receive the packet having the third VLAN label from the uplink switch following processing of the packet by the network security module;
replace the third VLAN label of the packet with the first VLAN label; and
forward the packet to the second virtual machine.

12. The physical server according to claim 10, wherein the machine readable instructions are further to cause the processor to:
detect a packet sent from the second virtual machine to the first virtual machine, wherein the packet has the first VLAN label;
replace the first VLAN label with the third VLAN label;
send the packet to the uplink switch, wherein the uplink switch is to send the packet to the network security module and the network security module is to process the packet, replace the third VLAN label with another VLAN label, and send the packet to the uplink switch;
receive the packet having the another VLAN label from the uplink switch;
replace the another VLAN label of the packet with the first VLAN label; and
forward the packet to the first virtual machine.

13. A non-transitory computer readable storage medium on which is stored machine readable instructions that when executed by a processor cause the processor to:
implement a virtual switch for the first virtual machine and the second virtual machine, wherein the first virtual machine and the second virtual machine are in the same virtual local area network (VLAN) that is identified by a first VLAN label;
detect a packet sent from the first virtual machine to the second virtual machine;
replace the first VLAN label with a second VLAN label, wherein the second VLAN label differs from the first VLAN label;
send the packet to an uplink switch, wherein the uplink switch is to send the packet to a network security module and the network security module is to process the packet, replace the second VLAN label with a third VLAN label, and send the packet to the uplink switch;
receive the packet having the third VLAN label from the uplink switch following processing of the packet by the network security module;
replace the third VLAN label of the packet with the first VLAN label; and
forward the packet to the second virtual machine.

14. The non-transitory computer readable storage medium according to claim 13, wherein the machine readable instructions are further to cause the processor to:
detect a packet sent from the second virtual machine to the first virtual machine, wherein the packet has the first VLAN label;
replace the first VLAN label with the third VLAN label;

send the packet to the uplink switch, wherein the uplink switch is to send the packet to the network security module and the network security module is to process the packet, replace the third VLAN label with another VLAN label, and send the packet to the uplink switch;

receive the packet having the another VLAN label from the uplink switch;

replace the another VLAN label of the packet with the first VLAN label; and forward the packet to the first virtual machine.

15. The non-transitory computer readable storage medium according to claim 13, wherein the machine readable instructions are further to cause the processor to:

send the packet to an uplink switch in response to the first VLAN label being replaced with the second VLAN label in the packet.

* * * * *